United States Patent
Medlin et al.

(10) Patent No.: US 11,632,947 B2
(45) Date of Patent: *Apr. 25, 2023

(54) DEER ATTRACTION DEVICE

(71) Applicant: Pick Outdoors LLC, Cedar Falls, IA (US)

(72) Inventors: Brandon Medlin, Cedar Falls, IA (US); Kade Hoppenworth, Cedar Falls, IA (US)

(73) Assignee: PICK OUTDOORS LLC, Cedar Falls, IA (US)

( * ) Notice: Subject to any disclaimer, the term of this patent is extended or adjusted under 35 U.S.C. 154(b) by 43 days.

This patent is subject to a terminal disclaimer.

(21) Appl. No.: 17/333,802

(22) Filed: May 28, 2021

(65) Prior Publication Data

US 2021/0282388 A1    Sep. 16, 2021

Related U.S. Application Data

(63) Continuation of application No. 16/040,212, filed on Jul. 19, 2018, now Pat. No. 11,064,693.

(60) Provisional application No. 62/535,658, filed on Jul. 21, 2017.

(51) Int. Cl.
    *A01M 31/00*    (2006.01)

(52) U.S. Cl.
    CPC .............................. *A01M 31/008* (2013.01)

(58) Field of Classification Search
    CPC .... A01M 31/06; A01M 31/00; A01M 31/008; F16M 11/04; F16M 11/16; F16M 11/24; F16M 13/02

USPC ......... 43/1, 2, 21.2; 248/689, 511, 521, 533, 248/534, 220.21, 220.22, 230.1, 274.1, 248/292.12, 309.1, 541

See application file for complete search history.

(56) References Cited

U.S. PATENT DOCUMENTS

| | | |
|---|---|---|
| 601,977 A | 4/1898 | McDonald |
| 635,612 A | 10/1899 | Tardel |
| 1,737,151 A | 11/1929 | Derbyshire |
| 2,238,134 A | 4/1941 | Schoen |
| 2,462,442 A | 2/1949 | Wallace |
| 2,502,049 A | 3/1950 | Kaminski |
| 2,941,767 A | 6/1960 | Mogey |
| 3,155,353 A | 11/1964 | Small |
| 3,304,036 A | 2/1967 | Davis |
| 5,344,115 A | 9/1994 | Mayne et al. |
| 5,836,327 A | 11/1998 | Davis |

(Continued)

FOREIGN PATENT DOCUMENTS

| | | |
|---|---|---|
| CA | 2635325 A1 | 12/2009 |
| DE | 2052823 A1 | 5/1972 |

(Continued)

*Primary Examiner* — Darren W Ark
*Assistant Examiner* — Katelyn T Truong
(74) *Attorney, Agent, or Firm* — Goodhue, Coleman & Owens, P.C.

(57) ABSTRACT

An apparatus for securing licking branches to a support structure includes a body suitable for attachment to a support structure, at least one branch holder extending outwardly from the annular body, and securing means for securing a branch in place within the branch holder. The securing means may include a clamp. The body may be an annular body for fitting over the support structure. The body may include a surface for fitting against the support structure with at least one loop operatively connected to the support structure. The angle of each of the at least one branch holder is adjustable.

18 Claims, 10 Drawing Sheets

(56) References Cited

U.S. PATENT DOCUMENTS

| | | |
|---|---|---|
| 8,087,626 B1 | 1/2012 | Weeden |
| 8,146,879 B2 | 4/2012 | Liao |
| 8,356,784 B2 | 1/2013 | Doll et al. |
| 9,087,462 B1 | 7/2015 | Gallus |
| 9,185,902 B1 | 11/2015 | Mazzei |
| 9,458,644 B1 | 10/2016 | Russell |
| 9,476,541 B1 | 10/2016 | Kastner et al. |
| 10,765,185 B1 | 9/2020 | Wengerd |
| 2003/0070698 A1 | 4/2003 | Wells |
| 2003/0094553 A1 | 5/2003 | Mullis |
| 2003/0178255 A1 | 9/2003 | Auer |
| 2006/0054772 A1 | 3/2006 | Priscott et al. |
| 2008/0149791 A1 | 6/2008 | Bradley |
| 2009/0084019 A1 | 4/2009 | Carnevali |
| 2010/0040360 A1 | 2/2010 | Scott |
| 2012/0043448 A1 | 2/2012 | Liao |
| 2014/0123538 A1 | 5/2014 | Matheson |
| 2015/0090849 A1 | 4/2015 | Breitweiser et al. |

FOREIGN PATENT DOCUMENTS

| | | |
|---|---|---|
| DE | 29707412 U1 | 7/1997 |
| DE | 202012102458 U1 | 9/2012 |
| WO | 2004101915 A1 | 11/2004 |

DEER ATTRACTION DEVICE

PRIORITY STATEMENT

This application is continuation of U.S. Non-Provisional patent application Ser. No. 16/040,212, filed on Jul. 19, 2018 which claims priority to U.S. Provisional Patent Application 62/535,658, filed on Jul. 21, 2017, both entitled Deer Attraction Device, hereby incorporated by reference in their entirety.

FIELD OF THE INVENTION

The present invention relates to hunting. More particularly, but not exclusively, the present invention relates to a device to assist in successfully hunting deer through controlled placement of licking branches.

BACKGROUND

Deer hunting is a widely known and popular sport which presents a number of challenges for a deer hunter. One of the foremost challenges is the natural ability of deer to detect the presence of hunters. This has led to various devices and methods to assist in concealing the hunter from the deer.

However, this method of hunting generally requires preparation of a location and thus effort is made to select a location which deer will likely visit and/or to pick a location that can be prepared in a manner that is likely to attract deer. Various methods include food plots, baits, minerals, and artificial scents. In some areas some of these methods may not be permissible under relevant laws and regulations. Such methods may also be time consuming and costly.

One approach is based on the use of licking branches. Licking branches are used by deer to communicate. During the rut, bucks may create scrapes or rubs. Scrapes are found below tree branches accessible to the deer where the ground is scraped with the front hooves to reveal bare earth. A buck may scent or rub scent into the scrape. In addition, the buck may mark the overhanging branches by licking branches. Bucks and does will both lick, chew and rub the so-called licking branches thereby allowing for deer to communicate with one another.

If one can identify the location of licking branches, one knows that deer are likely to visit the location. In addition, various attempts have been made at creating artificial licking branches. For example, branches may be wired to a support structure.

Despite various attempts at using licking branches, what is needed is are improved devices and methods for attracting deer using licking branches.

SUMMARY

Therefore, it is a primary object, feature, or advantage of the present invention to improve over the state of the art.

It is a further object, feature, or advantage of the present invention to provide improved devices and methods for attracting deer.

Another object, feature, or advantage is to provide an improved method of using licking branches.

A further object, feature, or advantage is to provide an apparatus which includes multiple licking branch holders.

Yet another object, feature, or advantage is to provide an apparatus with one or more licking branch holders and attachment structure which is readily attachable to a fence post or other support structure Another object, feature, or advantage is to provide an apparatus with adjustable features for optimal height positioning.

A further object, feature, or advantage is to provide an apparatus with a licking branch holder that is height adjustable.

A still further object, feature, or advantage is to provide a licking branch holder which is durable and versatile.

Another object, feature, or advantage is to provide a licking branch holder which is easy to use and effective.

One or more of these and/or other objects, features, or advantages of the present invention will become apparent from the specification and claims that follow. No single embodiment need provide each and every object, feature, or advantage. Different embodiments may have different objects, features, or advantages. Therefore, the present invention is not to be limited to or by an objects, features, or advantages stated herein.

A deer attraction apparatus for securing licking branches to a support structure includes a body suitable for attachment to a support structure, at least one branch holder extending outwardly from the body and securing means for securing a branch in place within the branch holder. The securing means may include a clamp which may include a set screw. The body may be an annular body for fitting over the support structure. The body may include a surface for fitting against the support structure with at least one loop operatively connected to the support structure. The angle of each of the at least one branch holder is adjustable.

In another use case the deer attraction apparatus for securing licking branches to support structure includes a body having a top end and a opposite bottom end and a central portion extending between the top end and the bottom end, at least one branch holder rotatably mounted to a central portion of the body and extending outwardly there from such that angle of the at least one branch holder relative to the body is adjustable, and each of the at least one branch holder having a branch insertion opening at the outward most end for receiving a branch. Each of the at least one branch holders may further have an opening orthogonal to the branch insertion opening and a thumb screw configured to extending into the opening for securing the branch. The deer attraction apparatus may be further comprising a slot extending through the central portion of the body for receiving a strap such the body is securable against the support structure. The top and the bottom end of the deer attraction apparatus may have a gripping surface with a plurality of teeth for engaging the support structure. The deer attraction may further have a t-shaped aperture at the bottom end for fitting over a t-post. The deer attraction apparatus may further comprise a hole for receiving a thumb screw configured for extending into the hole for securing the body to the t-post. A cross section of the body may generally triangular. The deer attraction apparatus may be further comprised of screw holes at the bottom and the top end for use in securing the body to the support structure.

DETAILED DESCRIPTION

The present invention provides for various embodiments to assist in deer hunting by strategic placement of licking branches.

Figure 1:
FIG. 1 is a photograph of a licking branch holder apparatus in use.

FIG. 1 illustrates one embodiment showing a deer licking apparatus 10 with branches 12 extending outwardly therefrom. Placing the tips of branches at around 4 feet to 4 feet six inches is generally an acceptable height for licking branches, although higher or lower heights may be acceptable. The deer licking apparatus 10 is shown mounted on a top of post 14. The post 14 may be a fence post, a t post, or other type of post. Alternatively, the deer licking apparatus 10 may be mounted on a tree or other type of support structure. A deer 16 is shown approaching the tips of the branches 12.

Figure 2:
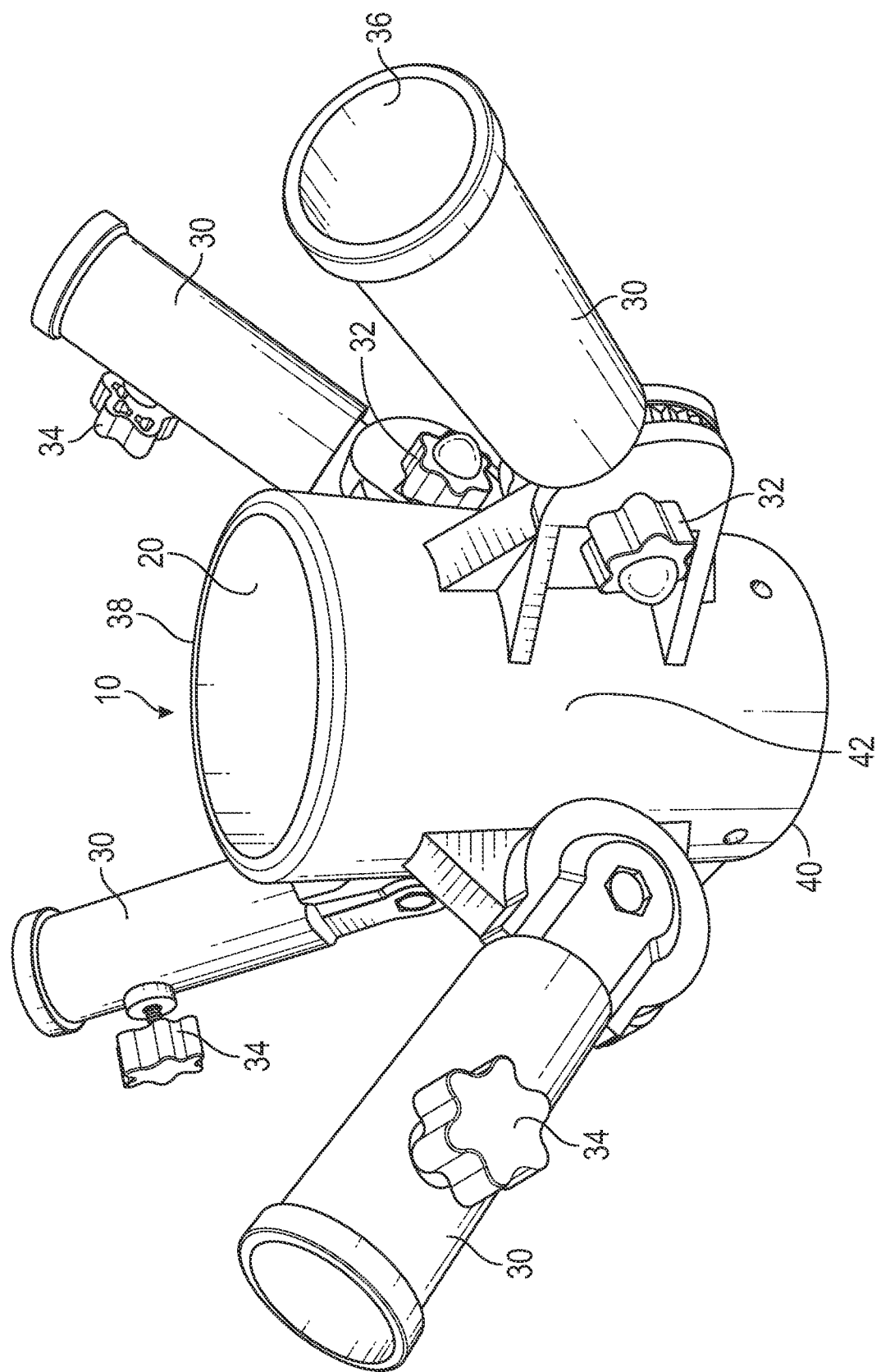
FIG. 2 illustrates one embodiment of a licking branch holder apparatus.

FIG. 2 illustrates one example of the deer attraction apparatus 10 in greater detail. As shown in FIG. 2, the deer licking apparatus 10 includes an annular body 20 suitable for fitting to a post or other structure. The annular body 20 has a top end 38, a bottom end 40 and a central portion 42 extending between the top end 38 and the bottom end 40. A plurality of branch holders 30 extend outwardly from an outer surface of the annular body. Knobs, handles, or other adjustment controls 32 allow for the angle of each of the branch holders 30 to be adjusted. Adjusting this angle results in a change in height of a branch extending from the branch holder as well as a change in distance between the tip of a branch being supported by the branch holder 30 and a central vertical axis extending through the apparatus 10. Each of the plurality of branch holders may have a branch insertion opening 36 configured to receive a licking branch. Knobs 34 may be used to turn a set screw (not shown) which may be used to clamp in place one or more branches within each branch holder 30, although it is contemplated that other types of clamps, fasteners or other securing means may be used to fasten or secure the branches.

Figure 3:
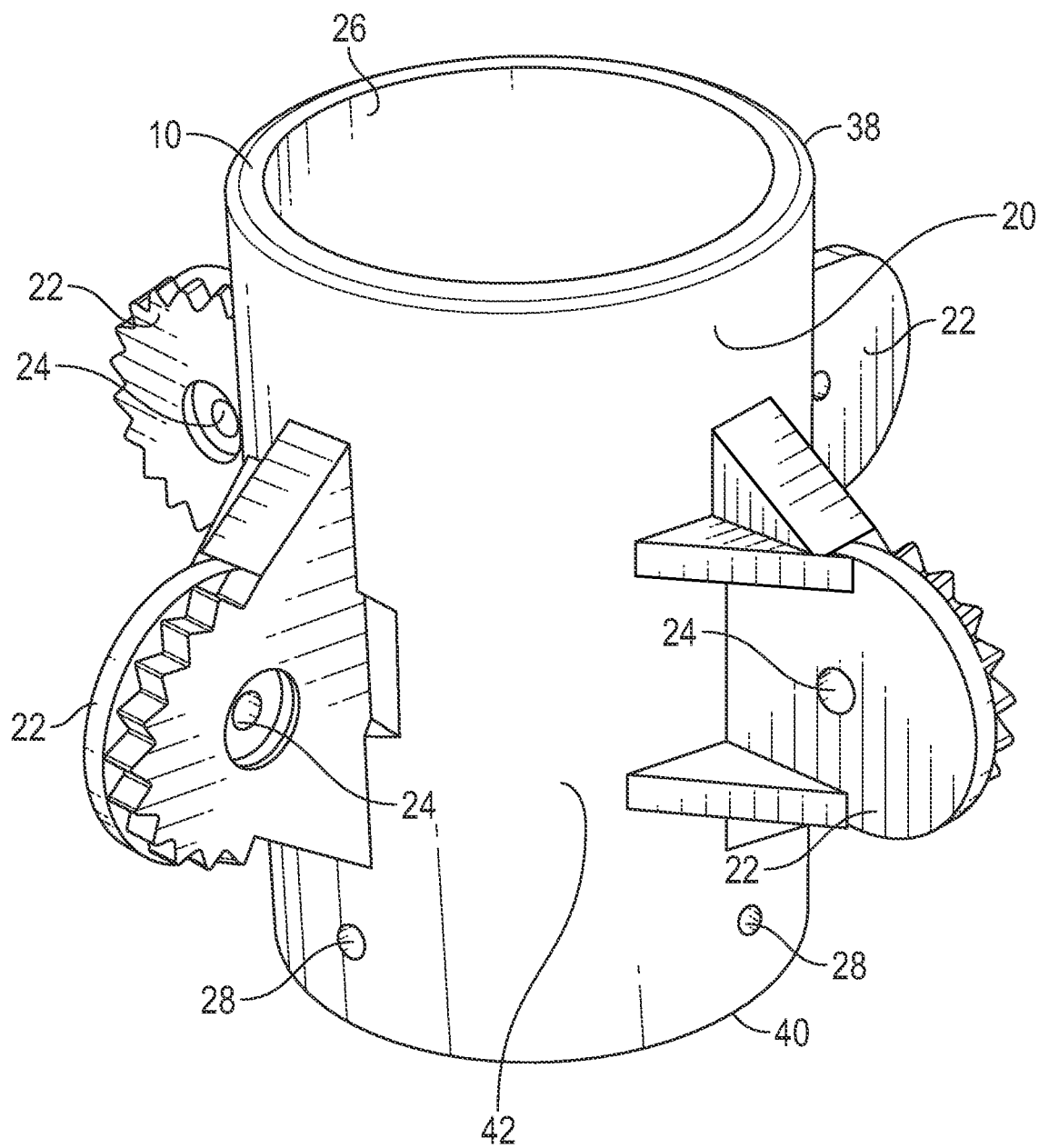
FIG. 3 illustrates portions of the apparatus.
Figure 4:
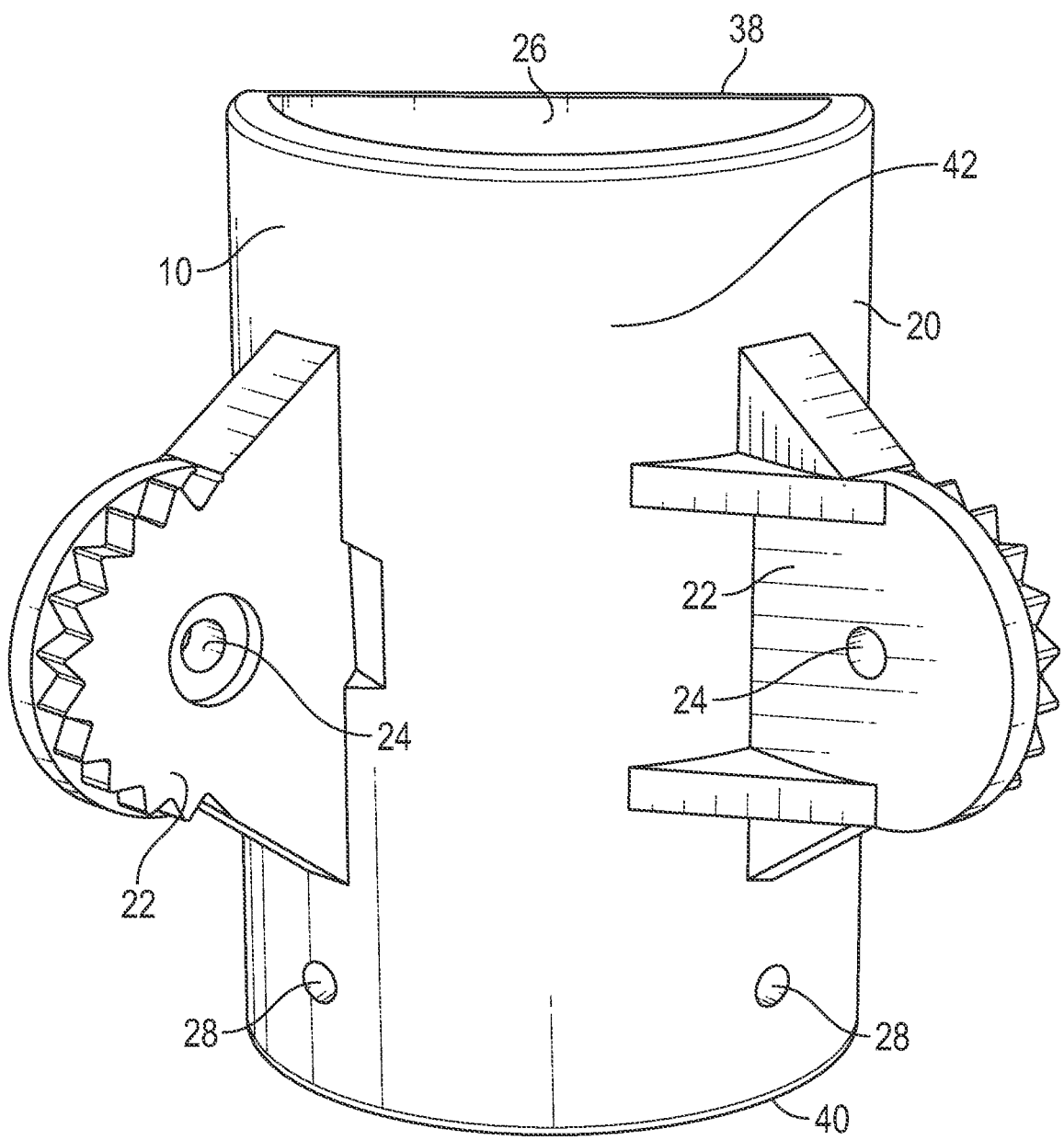
FIG. 4 is another view of portions of the apparatus.

FIG. 3 illustrates the annular body 20 of the deer attraction apparatus 10 with the branch holders removed. The annular body 20 suitable for fitting to a post or other structure. A plurality of tabs 22 extend outwardly from an outer surface of the annular body 20. An aperture 24 is shown extending through each of the plurality of tabs 22. A set screw (not shown) may be fitted through the aperture 24 and used to secure the branch holders in place. Geared teeth are shown on the tabs 22 which may mesh with corresponding portions of the branch holder to facilitate adjustment of the angle of the branch holders. An inner surface 26 of the apparatus 10 is shown which may be fitted over the post or other structure. Apertures 28 are shown which may extend through the annular body 20 and allow for securing of the deer attraction apparatus 10 to post such as with a set screw, nail or other type of fastener. FIG. 4 illustrates another view of the annular body 20 of the apparatus 20.

In operation, the deer attraction apparatus may be fitted over a post or other support structure. In some embodiments, the deer attraction apparatus may cap the post or other support structure. Alternatively, the deer attraction apparatus may be slide over a top of the post or other support structure to a desired position and then be secured in place such as through the use of nails or other types of fasteners. Once in place, branches may be positioned within the one or more branch holders and then the position of the branch holders may be adjusted to a desired height and position. Once the installation is complete, the site may be otherwise prepared such as through simulating scrapes or rubs.

Figure 5:
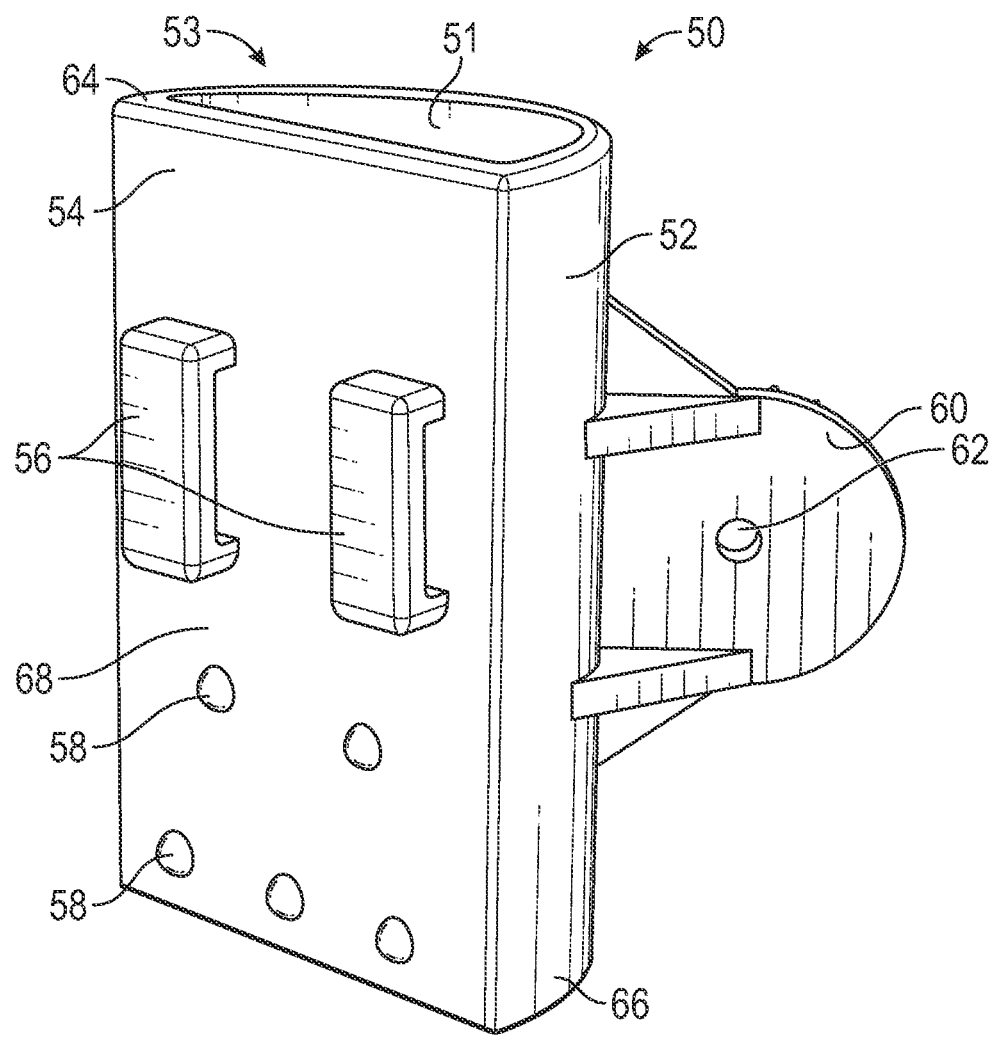
FIG. 5 illustrates an alternative embodiment of a licking branch holder apparatus.
Figure 6:
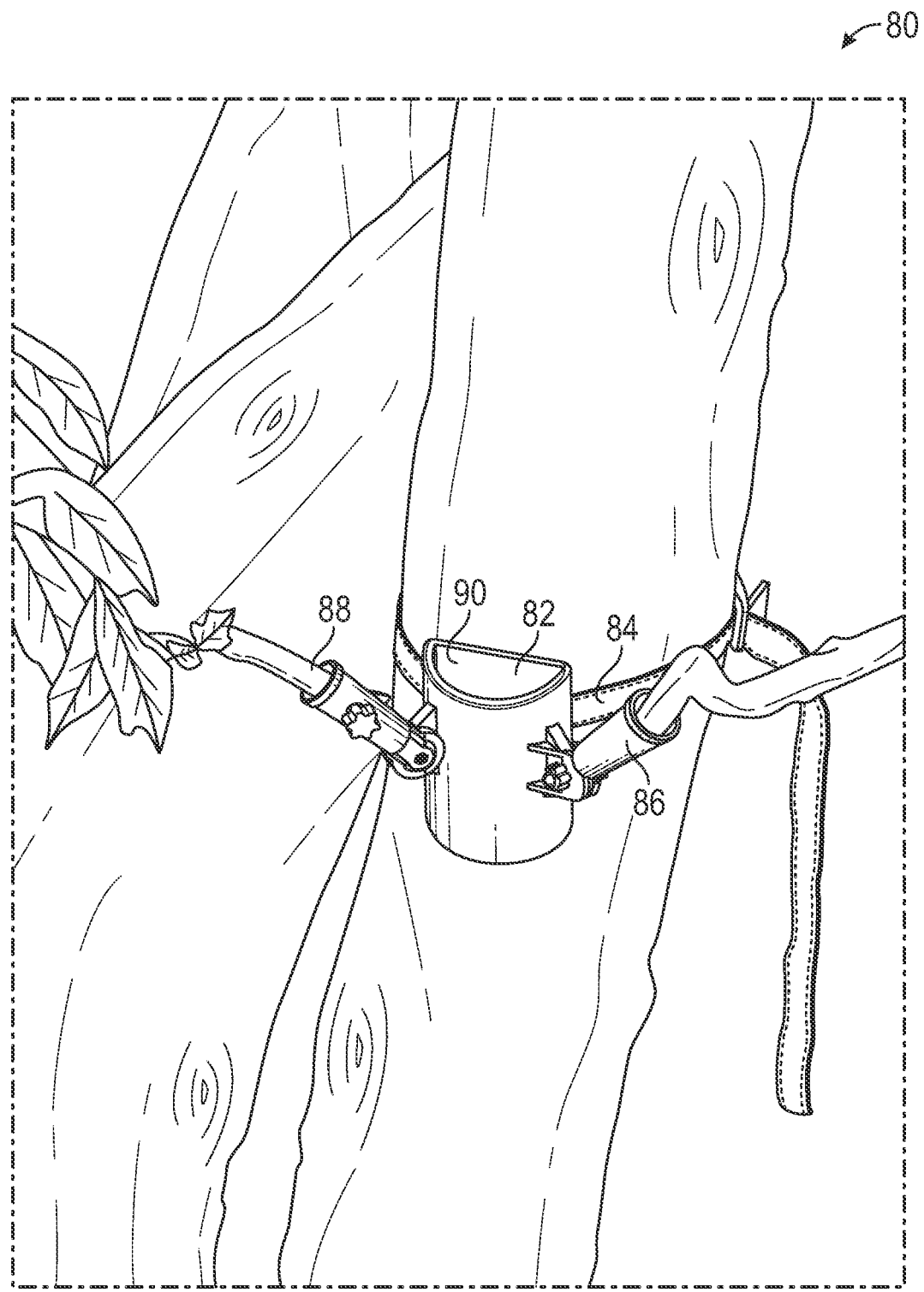
FIG. 6 illustrates another alternative embodiment of a licking branch holder apparatus.

FIG. 5 illustrates another embodiment of a deer attachment apparatus. FIG. 5 illustrates a deer attachment apparatus 50 has a body 53 which may have an opening 51 extending therethrough. The opening 51 may also only extend partially therethrough the body 53 allowing the user to place items such as a camera in the licking branch holder. The body 53 has a top end 64, a bottom end 68 and a central portion 66 extending between the top end 64 and the bottom end 66. An outer surface 52 is shown which may be generally rounded is shown. A generally flat surface 54 is also shown which may fit against a post. Fastener loops 56 are provided which allow a strap (not shown) to be used to secure the apparatus to a post, tree or other support structure. Nubs 58 are also shown which may be used to provide additional contact points to assist in securing to the post or other structure. A tab 60 extends outwardly and includes an aperture 62 which may be used to secure a branch holder (not shown) such as those illustrated in previous embodiments. For the embodiment shown in FIG. 5, note that because a strap may be used to fasten to a post, tree, or other structure (as shown in FIG. 6). The apparatus 50 may be attached at any height.

FIG. 6 illustrates another embodiment of a licking branch holder. FIG. 6 illustrates a deer attraction apparatus 80 where the deer attraction apparatus is attached to a tree or other structure with a belt 84 or similar structure. The deer attraction apparatus 80 may have an opening 82 extending therethrough. The opening 82 may also only extend partially therethrough the body 90 of the deer attraction apparatus 80, allowing the user to place items such as a camera in the licking branch holder. The deer attraction apparatus 80 may include a first branch holder 86 and a second branch holder 88. Additional branch holders may be present as a part of the licking branch holder. These individual branch holders may be positioned at varying distances from one another as desired by an individual. Branches may then be held in place and extend outwardly from the branch holders 86, 88 as shown. Due to the manner in which the device is attached or fastened to the tree (such as with a strap, belt, cord, string, rope), the system may be easily placed at an appropriate height on a tree or other support structure. In addition, the system may be easily removed from the tree or other structure. The strap or belt 84 may be pulled tight and clamped in place with a clamp, buckle, or other means.

Figure 7:
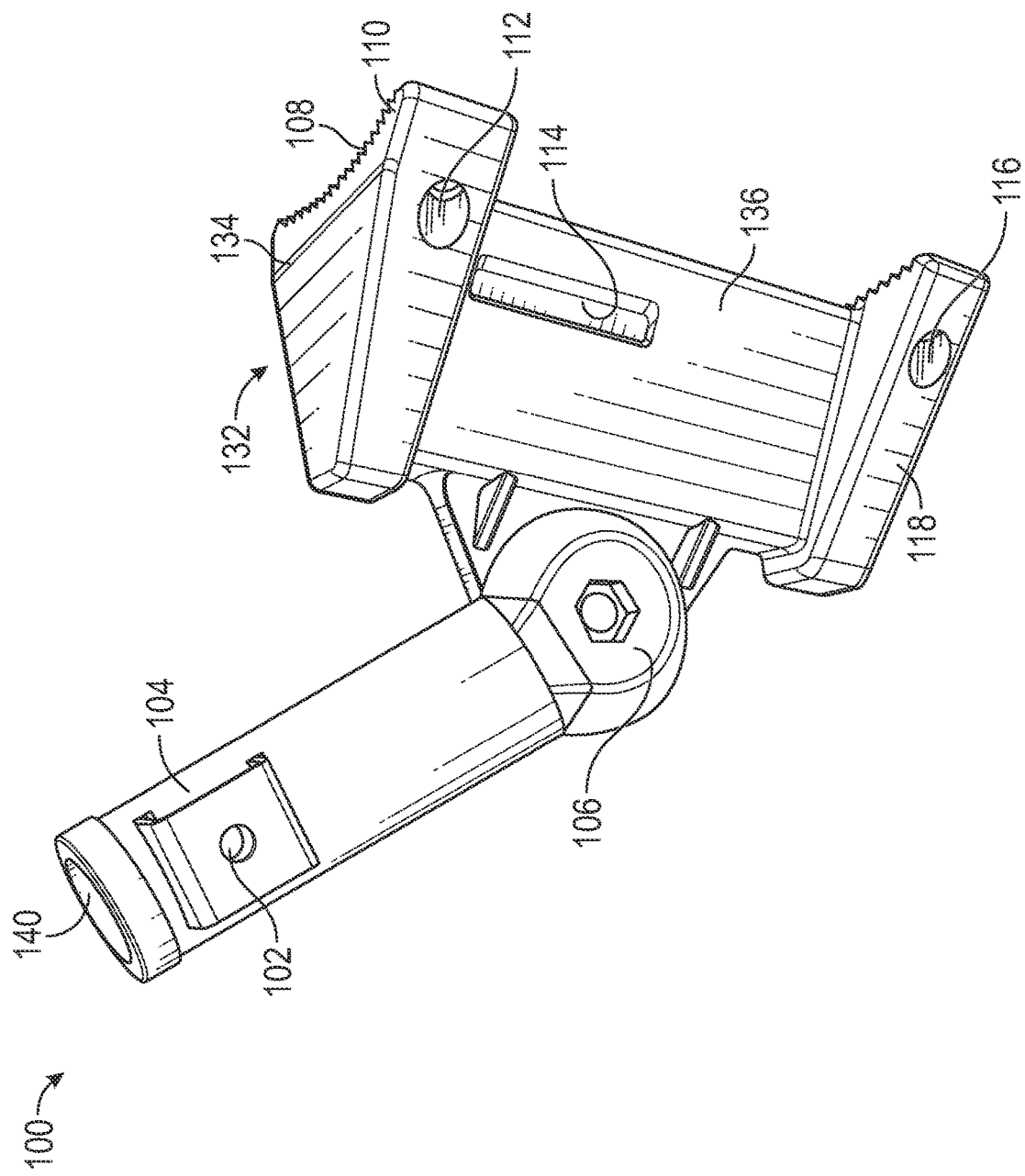
FIG. 7 illustrates another embodiment of a licking branch holder apparatus.
Figure 8:
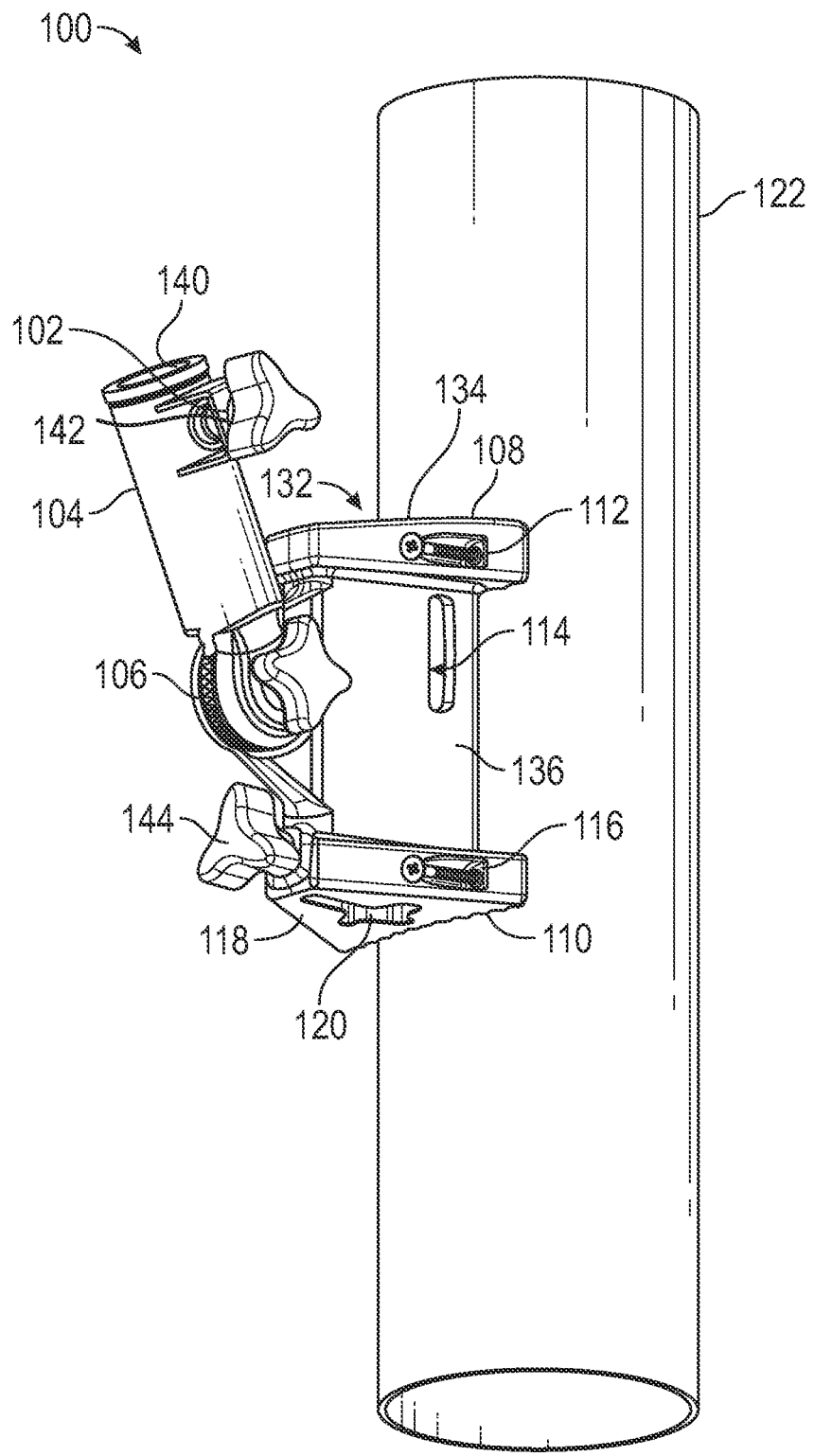
FIG. 8 illustrates another view of the licking branch holder apparatus of FIG. 7.
Figure 9:
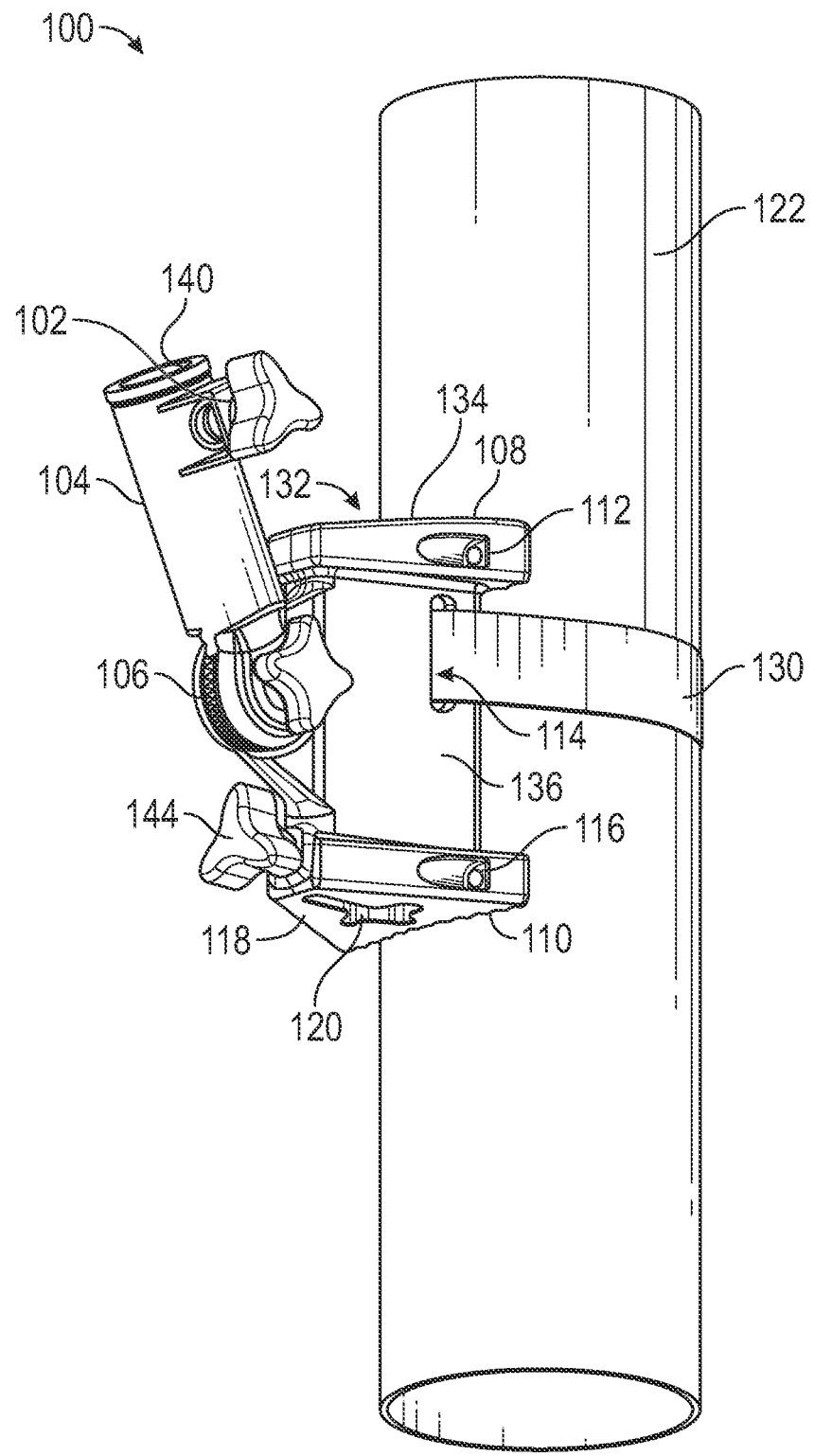
FIG. 9 illustrates another view of the licking branch holder apparatus of FIG. 7.
Figure 10:
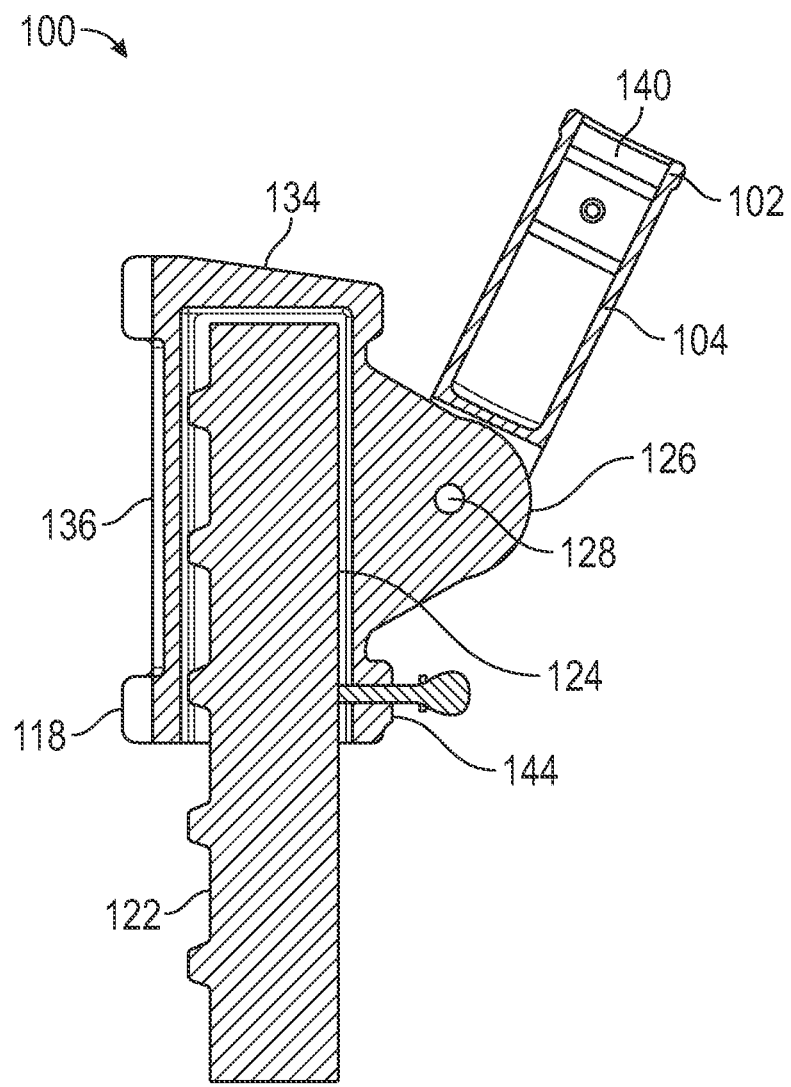
FIG. 10 illustrates another view of the licking branch holder apparatus of FIG. 7.

FIG. 7 illustrates another embodiment of a deer attraction apparatus 100. The deer attraction apparatus 100 includes a non-slip branch holder 104 which extends from a multi-tooth arm 106. The branch holder 104 may have a branch insertion opening 140 configured to receive a licking branch. The deer attraction apparatus may have a body 132 that includes a top end 134, a bottom end 118 and a central portion 136 extending between the top end 134 and the bottom end 118. The non-slip branch holder 104 may have a non-slip branch engaging mechanism 142 that may be implemented in various ways. For example, an opening 102 may be present which receives a thumb screw (as shown in FIG. 8) which may be used to grip a licking branch which is placed into the licking branch holder 100. Teeth 110 may be present along a surface 108 to be positioned against a post, tree, or other support structure. Where present, the toothed design provides for non-slip gripping to the tree or other support surface 122. A strap slot 114 is shown through which a belt or strap 130 may be inserted for securing to the tree or other support structure as shown in FIG. 9. A screw hole 112 is also shown which allows for additional securing to the tree, post or other support structure if desired (as shown by FIG. 8). Another screw hole 116 is shown at the base 118 for further securing of the licking branch holder 100 to a tree or other support structure. The base 118 may also be sized and shaped or otherwise designed to slide over a t-post. A t-shaped aperture 120 sized and shaped to slide over a t-post is also shown. FIGS. 8 and 9 illustrate the licking branch holder 100 secured to a support structure 122. A clamp 144 is also shown which allows for additional securing to the tree, post or other support structure if desired FIG. 10 shows a vertical cross-sectional view of the deer attraction apparatus 100. The top end 134 of the body 132 (shown in FIG. 9) may rest upon the top of the support structure 122. The support structure may be a t-post, wherein the t-post is slide through a t-shaped aperture 120 (not shown). A clamp 144 is also shown which allows for additional securing of base 118 to the tree, post or other support structure 122 if desired. In other use cases screws may be used to secure the base to the support structure.

Although described herein generally for deer hunting. It is to be understood that there are other uses for the various examples of the invention. For example, the invention may be used to observe deer or their habits. The product may be used by nature photographers or videographers in order to provide increased opportunities to photograph deer, or for others who desire to observe deer.

Therefore, various apparatus and methods for attracting deer using licking branches have been shown and described. Although particular embodiments are shown, the present invention contemplates numerous variations, options, and alternatives. This includes variations in the number of branch holders supported, variations in the manner in which the apparatus is secured to a post, tree, or other structure, variations in the materials being used, variations in sizes, shapes, and geometries, and other variations. Thus, the present invention is not to be limited to the specific embodiments set forth herein.

What is claimed is:

1. A deer attraction apparatus for securing licking branches to a support structure, the deer attraction apparatus comprising:
   a body having a top end and an opposite bottom end and a central portion extending between the top end and the bottom end along a vertical axis of the central portion;
   each of the top end and the bottom end having a base for fitting against a tree, and a first side and opposite second side extending inwardly from the base such that the deer attraction apparatus is configured for support by the tree;
   at least one branch holder rotatably mounted to the central portion of the body and extending radially outwardly there from such that an angle of the at least one branch holder relative to the vertical axis of the central portion of the body is adjustable;
   each of the at least one branch holder having a branch insertion opening at an outward most end for receiving a branch such that the branch extends radially outwardly and away from the central portion of the body and such that a height of the branch insertion opening is adjustable by adjusting the angle of the at least one branch holder relative to the vertical axis of the central portion of the body;
   each of the at least one branch holder having a securing means for securing the branch in place; and
   a t-shaped aperture at the bottom end sized and shaped for fitting over a t-post such that the deer attraction apparatus is configured for support by the t-post;
   wherein the body includes a first aperture positioned in the first side of the top end and a second aperture positioned in the second side of the top end wherein the first aperture and the second aperture are sized and positioned to accept screws for securing the deer attraction apparatus to the tree.

2. The deer attraction apparatus of claim 1 wherein the securing means comprises a clamp.

3. The deer attraction apparatus of claim 2 wherein the clamp comprises a knob mounted on a screw.

4. The deer attraction apparatus of claim 1 further comprising a camera positioned within the at least one branch holder.

5. The deer attraction apparatus of claim 1 further comprising the branch positioned within the at least one branch holder.

6. The deer attraction apparatus of claim 1 wherein the body is attached to a tree with a strap or belt.

7. The deer attraction apparatus of claim 6 further comprising one or more slots in the body for receiving the strap or belt.

8. The deer attraction apparatus of claim 1 wherein the base of each of the top end and the bottom end comprises teeth to reduce slippage.

9. The deer attraction apparatus of claim 1 wherein the base of each of the top end and the bottom end has an arcuate shape for fitting against a tree.

10. A deer attraction apparatus for securing licking branches to a support structure, the deer attraction apparatus comprising:
    a body having a top end and an opposite bottom end and a central portion extending between the top end and the bottom end along a vertical axis of the central portion;
    each of the top end and the bottom end having a base for fitting against a tree, and a first side and opposite second side extending inwardly from the base such that the deer attraction apparatus is configured for support by the tree;
    at least one branch holder rotatably mounted to the central portion of the body and extending radially outwardly there from such that an angle of the at least one branch holder relative to the vertical axis of the central portion of the body is adjustable;
    each of the at least one branch holder having a branch insertion opening at an outward most end for receiving a branch such that the branch extends radially outwardly and away from the central portion of the body and such that a height of the branch insertion opening is adjustable by adjusting the angle of the at least one branch holder relative to the vertical axis of the central portion of the body;
    each of the at least one branch holder having a securing means for securing the branch in place;
    a t-shaped aperture at the bottom end sized and shaped for fitting over a t-post such that the deer attraction apparatus is configured for support by the t-post; and at least one slot in the central portion of the body for receiving a strap or belt for securing the deer attraction apparatus to a tree.

11. A deer attraction apparatus for securing licking branches to a support structure, the deer attraction apparatus comprising:
- a body having a top end and an opposite bottom end and a central portion extending between the top end and the bottom end along a vertical axis of the central portion;
- each of the top end and the bottom end having a base for fitting against the support structure, and a first side and opposite second side extending inwardly from the base such that the deer attraction apparatus is configured for support by the support structure, the base for each of the top end and the bottom end having a gripping surface with a plurality of teeth for engaging the support structure;
- at least one branch holder rotatably mounted to the central portion of the body and extending outwardly there from such that an angle of the at least one branch holder relative to the body is adjustable;
- each of the at least one branch holder having a branch insertion opening at an outward most end for receiving a branch such that a height of the branch insertion opening is adjustable by adjusting the angle of the at least one branch holder relative to the vertical axis of the central portion of the body;
- a licking branch secured in a first of the at least one branch holder; and
- a t-shaped aperture at the bottom end for fitting over a t-post such that the deer attraction device is configured for being supported by the t-post.

12. The deer attraction apparatus of claim 11 further comprising:
- a slot extending through the central portion of the body for receiving a strap such that the body is securable against the tree.

13. The deer attraction apparatus of claim 12 further comprising screw holes at the bottom and the top ends for use in securing the body to the tree.

14. The deer attraction apparatus of claim 13 wherein the licking branch is secured with a securing means.

15. A deer attraction apparatus for securing licking branches to a support structure, the deer attraction apparatus comprising:
- a body having a top end and an opposite bottom end and a central portion extending between the top end and the bottom end along a vertical axis of the central portion;
- each of the top end and the bottom end having a base for fitting against a tree, the base for each of the top end and the bottom end having a gripping surface with a plurality of teeth for engaging the support structure;
- at least one branch holder rotatably mounted to the central portion of the body and extending outwardly there from such that an angle of the at least one branch holder relative to the vertical axis of the body is adjustable;
- each of the at least one branch holder having a branch insertion opening at an outward most end for receiving a branch such that a height of the branch insertion opening is adjustable by adjusting the angle of the at least one branch holder relative to the vertical axis of the central portion of the body;
- each of the at least one branch holder having an opening orthogonal to the branch insertion opening and a thumb screw configured for extending into the opening orthogonal to the branch insertion opening for securing the branch;
- a slot extending through the central portion of the body for receiving a strap such that the body is securable against the support structure;
- screw holes at the bottom and the top ends for use in securing the body to the support structure;
- a t-shaped aperture at the bottom end for fitting over a t-post such that the t-post supports the deer attraction apparatus.

16. The deer attraction apparatus of claim 15 further comprising the branch positioned within a first branch holder of the at least one branch holder.

17. The deer attraction apparatus of claim 15 further comprising a camera positioned within a first branch holder of the at least one branch holder.

18. The deer attraction apparatus of claim 15, further comprising a hole for receiving a knob screw configured for extending into the t-shaped aperture for securing the body to the t-post.

* * * * *